(12) United States Patent
Qureshi et al.

(10) Patent No.: US 10,005,009 B2
(45) Date of Patent: Jun. 26, 2018

(54) STRAINER FOR A FILLING PORT

(71) Applicant: Shaw Development, LLC, Bonita Springs, FL (US)

(72) Inventors: Abdul Faheem Qureshi, Naples, FL (US); Sree Hyma Sudhakar Paruchuri, Bonita Springs, FL (US); Steven Milette, Naples, FL (US)

(73) Assignee: Shaw Development, LLC, Bonita Springs, FL (US)

( * ) Notice: Subject to any disclaimer, the term of this patent is extended or adjusted under 35 U.S.C. 154(b) by 496 days.

(21) Appl. No.: 14/591,501

(22) Filed: Jan. 7, 2015

(65) Prior Publication Data

US 2016/0193553 A1    Jul. 7, 2016

(51) Int. Cl.
*B01D 35/027* (2006.01)
*B01D 29/27* (2006.01)

(52) U.S. Cl.
CPC .......... *B01D 29/27* (2013.01); *B01D 35/027* (2013.01)

(58) Field of Classification Search
None
See application file for complete search history.

(56) References Cited

U.S. PATENT DOCUMENTS

| 5,505,849 A | * | 4/1996 | Rama, Jr. | B01D 29/27 210/172.6 |
| 9,248,390 B2 | | 2/2016 | Hudgens et al. | |
| 2002/0021939 A1 | * | 2/2002 | Allard | B01D 29/27 405/43 |
| 2012/0211105 A1 | * | 8/2012 | Georis | B60K 15/035 137/588 |
| 2013/0134175 A1 | * | 5/2013 | O'Hara | B60K 15/00 220/827 |

FOREIGN PATENT DOCUMENTS

| EP | 2492128 B1 | 8/2013 | |
| GB | 2198963 A | * 6/1988 | ............. B01D 29/27 |

* cited by examiner

*Primary Examiner* — Patrick Orme
(74) *Attorney, Agent, or Firm* — Hahn Loeser & Parks LLP

(57) ABSTRACT

A service port for a tank that receives a fluid, the service port including a body having a first end and a second end, the body defining a bore that opens at the first end and second end of the body; a strainer attached to the second end of the body, the strainer including a strainer element that has a first end and a second end, and a pair of sides; wherein the strainer element is closed at the first end and open at the second end defining a strainer volume therebetween; the strainer element being permeable to liquid; wherein the second end of the strainer element is attached about the bore and wherein a wall of the strainer element extending from the second end of the strainer element toward the first end of the strainer element is oriented generally parallel to a flow direction of fluid.

22 Claims, 5 Drawing Sheets

STRAINER FOR A FILLING PORT

TECHNICAL FIELD

The present invention relates generally to fluid filling or service ports, and more particularly to a strainer attached to service port to catch debris or particulate entrained in the filling liquid. More particularly, the present invention relates to a service port having a strainer extending downstream of the filling port defining a strainer volume, where the strainer minimizes the surface area normal to the flow path and includes a debris trap element that extends into the strainer volume to catch debris.

BACKGROUND

Fluid filling ports are used in a number of applications including filling diesel emissions fluid (DEF) tanks. DEF tanks are becoming the standard for heavy-duty diesel engines, particularly those found in trucks and other fleet vehicles. DEF is an aqueous urea solution (AUS) used in diesel emissions systems. To reduce emissions, DEF is sprayed directly into the exhaust stream to chemically neutralize harmful nitrogen oxide emissions. DEF is replenished using fill bottles or service station pumps by inserting a nozzle from the pump or fill bottle into the fluid filling port to dispense fluid to the tank. To that end, fluid filling port may be provided on the tank or in a conduit, such as a fill tube or the like, connected to the tank.

To prevent debris from entering the tank, a simple screen is attached to cover the outlet of the filling port. The screen is generally normal to the flow of fluid and impedes the flow of fluid to a significant extent or disrupts the flow of fluid. Also, the screen causes turbulence within the flow, which may further interrupt or slow the filling process by splashing upward toward the filling nozzle causing premature shut-off or spillage. Moreover, debris in the strainer may be splashed back into the nozzle resulting in a nozzle malfunction. To that end, it is desirable to provide an element that removes debris from the flow with less of an impact on the rate of flow than the screen elements found in the art.

BRIEF SUMMARY

The present invention generally provides a service port for a tank that receives a fluid, the service port including a body having a first end and a second end, the body defining a bore that opens at the first end and second end of the body, wherein the second end is downstream of the first end; a strainer attached to the second end of the body, the strainer including a strainer element that has a first end and a second end, and a pair of sides; wherein the strainer element is closed at the first end and open at the second end defining a strainer volume therebetween; the strainer element being permeable to liquid; wherein the second end of the strainer element is attached about the bore to receive fluid from the bore within the strainer volume and wherein a wall of the strainer element extending from the second end of the strainer element toward the first end of the strainer element is oriented generally parallel to a flow direction of the fluid.

The invention further provides a service port for delivering a liquid including a body defining a bore through which liquid is delivered, a strainer in fluid communication with the bore, the strainer including a strainer element including a first end, a second end, and a pair of sides, wherein the strainer element defines an enclosed strainer volume open at the second end to allow the liquid from the bore to enter the strainer volume, wherein the strainer element is constructed of a porous material that is permeable to the liquid; wherein the strainer further includes a support assembly engaging the strainer element and spreading the sides of the strainer element away from each other along at least a portion of the strainer element adjacent to the first end to minimize a portion of the strainer element normal to the liquid flowing from the bore.

The invention further provides a strainer for a service port that provides a flow of liquid, the strainer including a strainer element including a first end, a second end, and a pair of sides, wherein the strainer element defines an enclosed strainer volume open at the second end, wherein the strainer element is constructed of a porous material that is permeable to the liquid; wherein the strainer further includes a support assembly engaging the strainer element and spreading the sides of the strainer element away from each other along at least a portion of the strainer element adjacent to the first end to minimize a portion of the strainer element normal to the flow of liquid.

DETAILED DESCRIPTION

Figure 1:
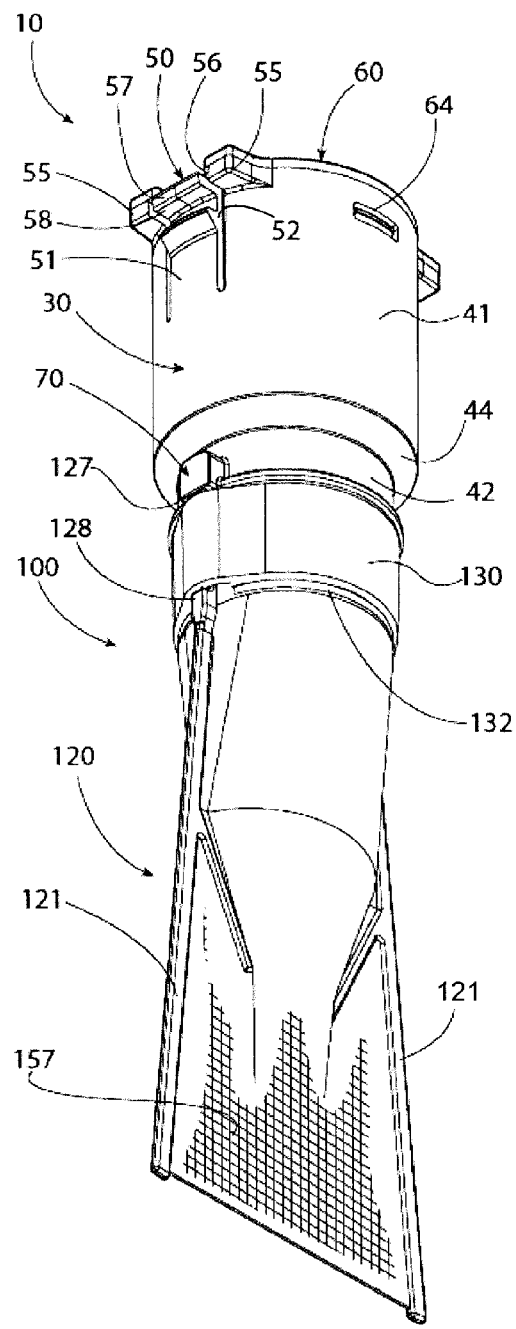
FIG. 1 is a bottom perspective view of a service port having a filter according to the invention.
Figure 2:
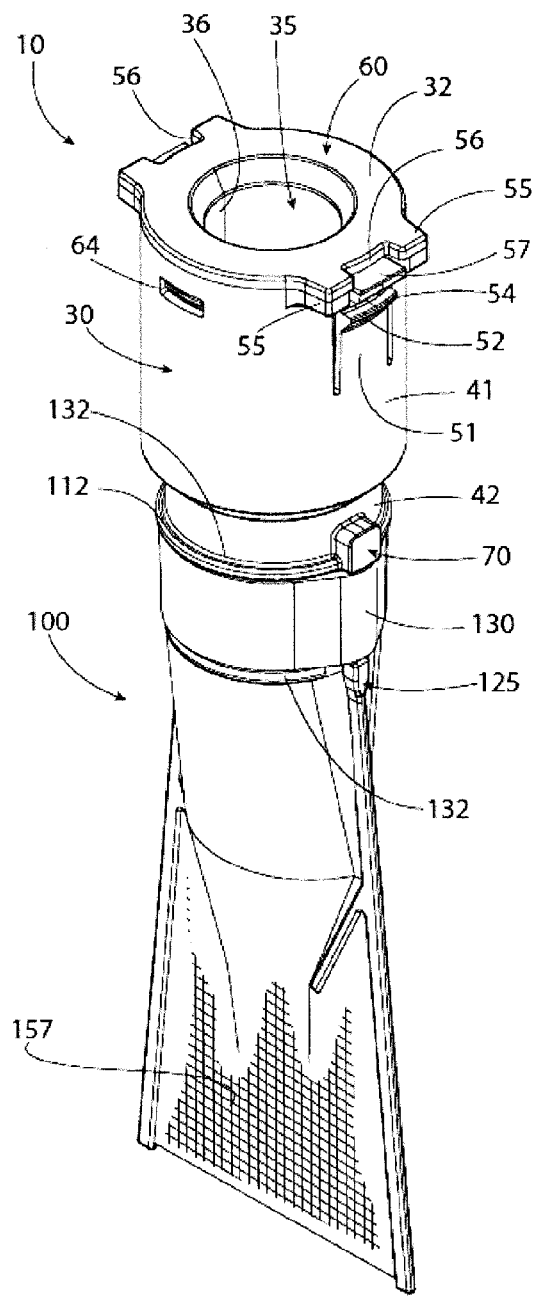
FIG. 2 is a top perspective view thereof.

A strainer according to the invention is generally indicated by the number 100 in the accompanying drawings. Strainer 100 is used in connection with a fluid filling port, which may also be referred to as a refilling interface or service port, generally indicated by the number 10 herein. Fluid filling port 10 is in fluid communication with a reservoir or tank 20 for storing a fluid F. The fluid F discussed herein is a diesel emissions fluid (DEF) but the invention is applicable to fluid filler ports used in connection with any other type of fluid. Strainer 100 is described in the context of a vehicle application, but it will be understood that strainer 100 may be used in other applications where straining of the fluid before entering a system is desired.

Figure 7:
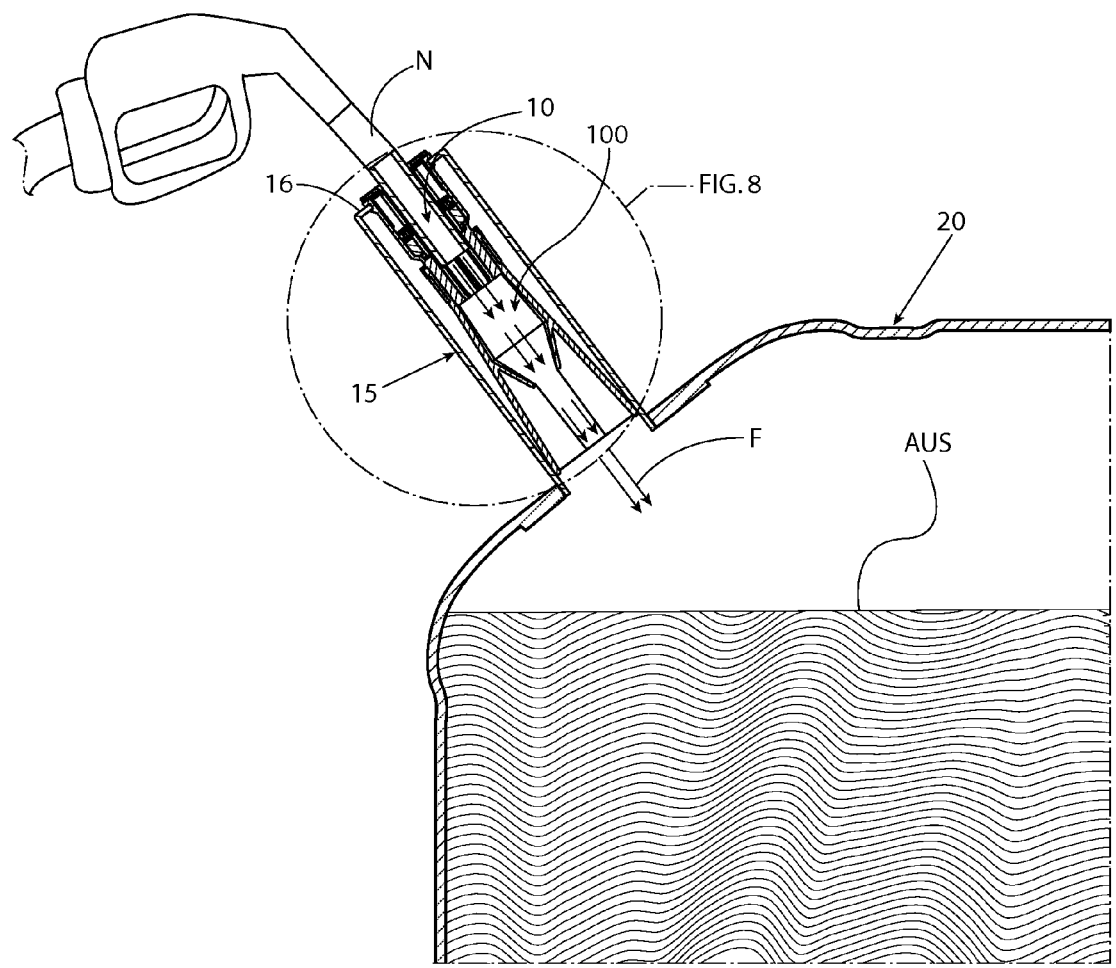
FIG. 7 is a partially schematic sectional side view of a service port having a filter according to the invention used in connection with a DEF tank.

Turning to the embodiment shown in the drawings, with reference to FIG. 7, a service port 10 is provided within a fill tube 15, which is fluidly connected to tank 20. The example shown is somewhat schematic and it will be appreciated that service port 10 may be directly attached to tank 20 or additional hoses or conduits may extend between fill tube 15 and tank 20 depending on the remoteness of the tank 20 or other factors dictated by the particular application. In the example shown, service port 10 is fluidly connected to a tank 20 for DEF in a vehicle application. Tank 20 may be located in an engine compartment or other area within the vehicle that is not easily accessed for refilling the DEF at ordinary service stops. To that end, fill tube 15 extends outward from tank 20 to a location convenient for filling and refilling of DEF. For example, fill tube 15 may extend to an external panel of vehicle. Often times, the DEF fill port is placed adjacent to a diesel fuel fill port for convenient filling of both the fuel and DEF tank during a service stop.

Service port 10 includes a body, generally indicated at 30, that may be received within fill tube 15 and supported at one end of fill tube 15. Body 30 may have any external shape or contour required by a the contour of the fill tube 15 or other application requirements. Generally, body 30 is tubular in that it has a wall 32 that defines an inner bore 35 for transferring fluid from a source such as a fill bottle or hose from a pump to tank 20. The bore 35 opens to atmosphere at a first end 36 for receipt of the nozzle N of the fill bottle or pump hose. The second end 37 of bore 35 opens into the fill tube 15.

Body configuration may vary based on the fill tube in which it is received or other factors. For example, some service ports are required to include an interlock system to prevent an improper fluid from entering tank 20. For example, interlock system may include a switch that requires alignment of the nozzle or spout with a corresponding magnet or detector on the service port before allowing fluid to flow from nozzle or into tank 20. To that end, body 30 may be configured to accommodate the magnet needed in this application. In addition, body 30 may be configured with recesses, ribs or other features to accommodate seals or other components.

Figure 5:
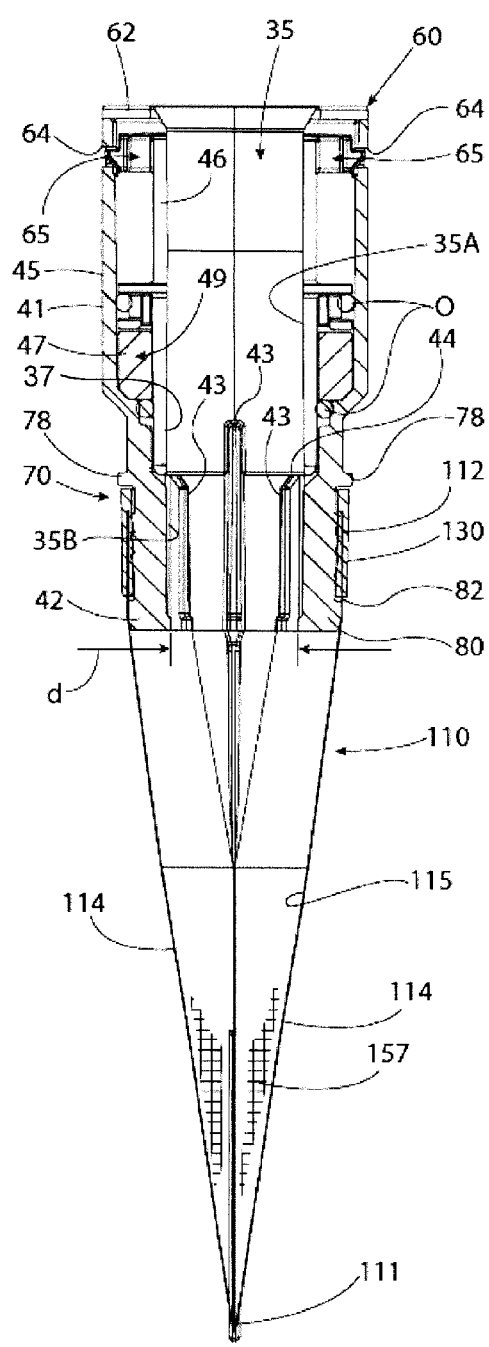
FIG. 5 is a sectional front view as might be seen along line 5-5 in FIG. 4.
Figure 8:
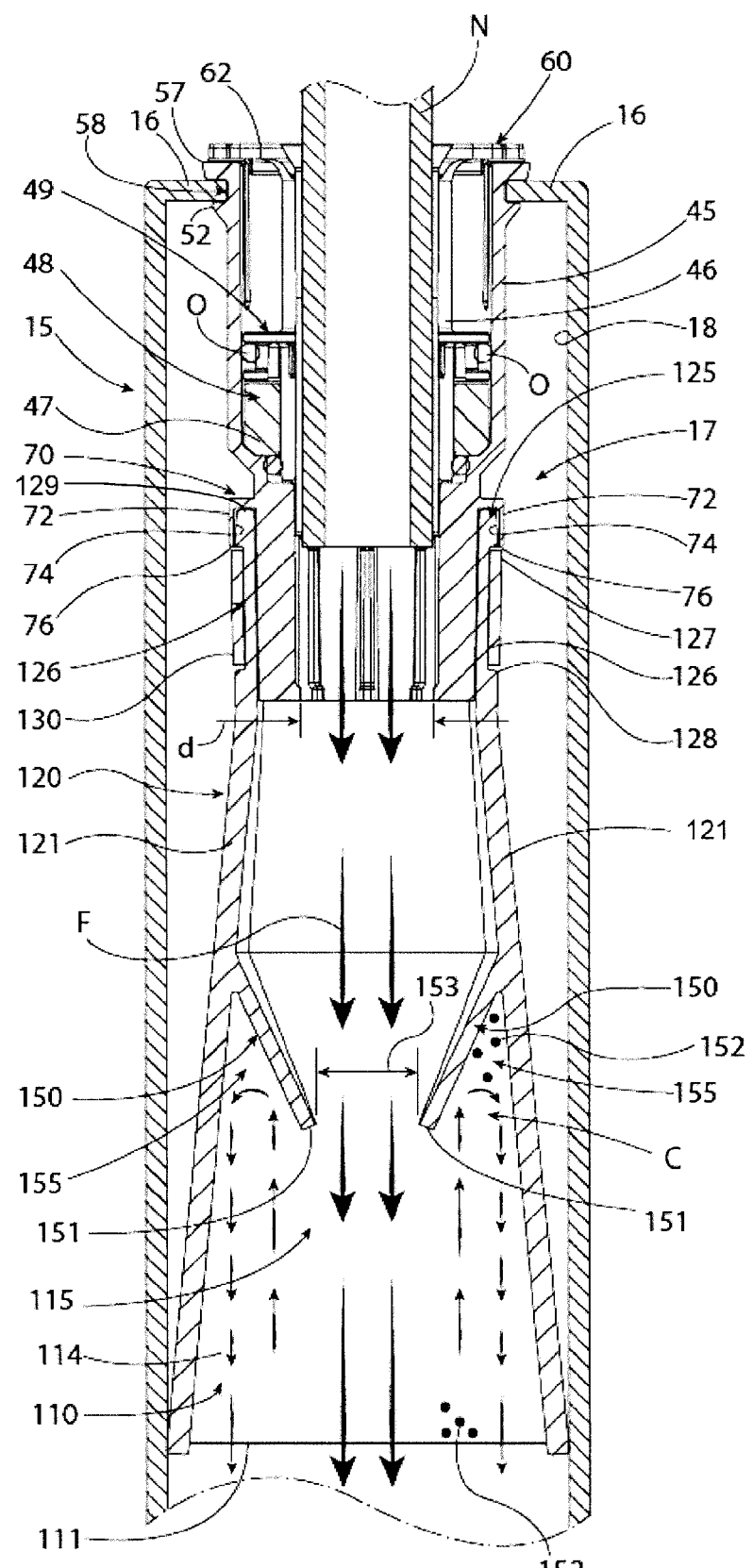
FIG. 8 is an enlarged sectional view of the area indicated in FIG. 7.

In the example shown, body 30 is a generally cylindrical member having a first portion 41 and a second portion 42. First and second portions 41, 42 define a common bore 35 as discussed above. The first portion 41 defines a first bore portion 35A that generally is sized to accommodate the nozzle or spout from a filler nozzle. The second portion, which may be referred to as a fill restrictor or simply a restrictor 42 defines a second bore portion 35B that is similar in dimension to first bore portion 35A, but includes inwardly extending ribs 43 that effectively reduce the diameter of the bore 35 at one end and act as a stop to the insertion of nozzle N. The outer diameter of restrictor 42 in the example shown is defined by ISO 22241. Internally, as shown in FIGS. 5 and 8, nozzle N may have a taper at its end that assists in aligning nozzle N for purposes of the auto shut-off. To that end, an upper portion of ribs 43 may have face that slopes downward and inward from the end of first bore portion 35A to create tapered recess 44 in each rib to locate a tapered portion T of nozzle N during insertion. Moreover, first portion 41 of body 30 may have an annular open area formed between an outer wall 45 that forms the exterior of body 30 and an inner wall 46 that defines the first portion of bore 35. An interlock assembly, generally indicated by the number 48, may be provided therein. Interlock assembly 48 may be any suitable assembly known in the art. In the example shown, interlock assembly includes a magnet 47 supported within a receiver 49, which, as shown, may be sealed at either end to protect the magnet 47 from any moisture. In the example shown, o-ring seals O are provided between the magnet 47 and the base of receiver 49 and at an upper portion of receiver 49 between wall 45 and a flange forming the top of receiver 49.

The exterior wall 45 of body 30 includes a detent assembly 50 including a pair of diametrically opposed flexible tabs 51 with outwardly extending projections 52 having a sloped leading edge 53 extending downward and inward from a top surface 54 that extends perpendicular to the surface of body 30. Retention tabs 55 extend from body 30 above and spaced from top surface 54 of projections 52. Service port 10 may be inserted into a fill neck 15 and secured by capturing the rim 16 of fill neck 15 between detent assembly 50 and retention tabs 55. As shown, retention tabs 55 may be spaced from each other defining a gap 56 therebetween for receipt of a detent retention tab 57 formed on detent assembly 50. As best seen in FIG. 1 and FIG. 8, detent retention tab 57 may be formed on flexible tab 51 above top surface 54 of projection. Retention tab 57 is axially spaced from top surface 54 to define a gap 58 in which the rim 16 of filler neck 15 is received. In this embodiment, rim 16 is captured within the gap 58 formed by detent assembly 50. To install service port 10 within filler neck 15, body 30 is inserted within the bore 17 defined by the inner surface 18 of filler neck 15. As shown rim 16 of filler neck 15 extends inward of the inner surface 18 and the projections 52 on detent assembly 50 extend outward of the rim 16 such that as the body 30 is inserted contact between the rim 16 and the sloped surface of projection 52 causes tab 51 to flex inward to clear rim 16. Once top surface 54 clears rim, the bias within flexible tabs 51 force the tabs 51 outward to seat rim 16 within gap 58.

Figure 3:
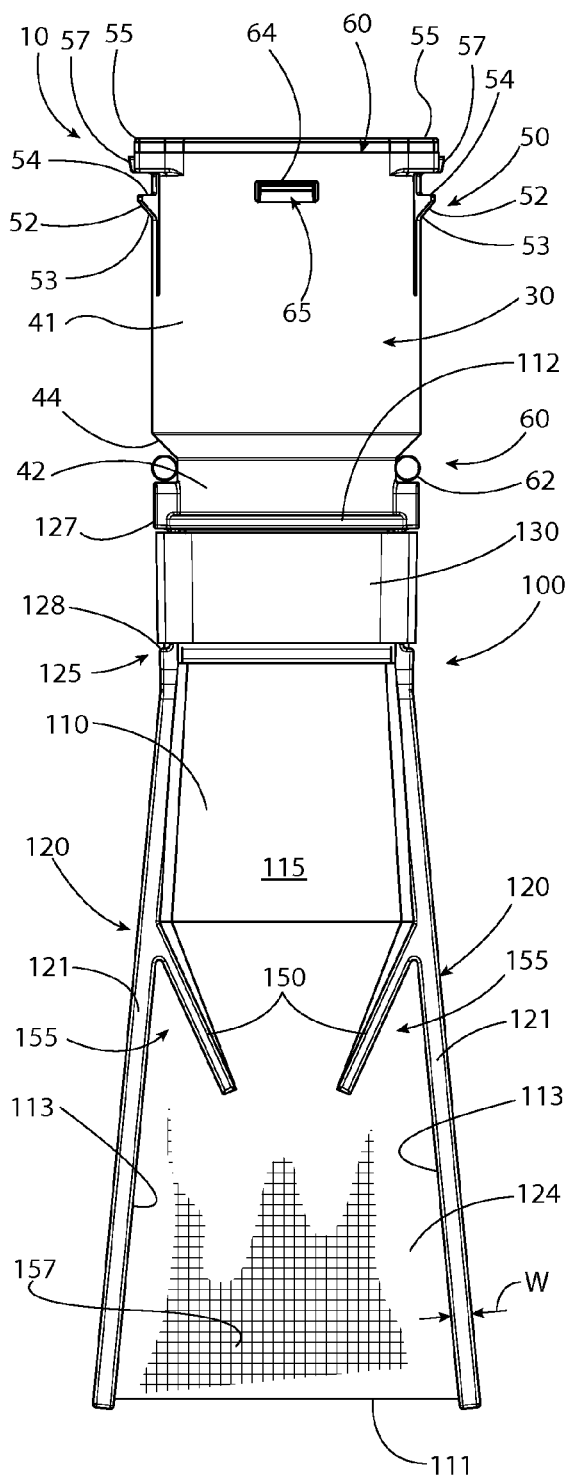
FIG. 3 is a front elevational view thereof.

As best shown in FIGS. 5 and 8, a cover assembly 60 may close the top of body 30. When using an interlock assembly 48, assembly of these components may be required before the cover assembly 60 is installed. In this instance cover assembly 60 includes a cover 62 that is attached at the top of body 30. Attachment of cover 62 may be made in any suitable manner. In the example shown, exterior wall 45 of body 30 defines receivers 64 that accept one or more detents 65 extending from cover 62 to hold it in place. In the example shown, receivers 64 extend through exterior wall 45 so that when detent 65 is in place it is visible from the outside of body 30 (FIG. 3). While detent 65 may make an audible click, providing this visibility allows the assembly to verify proper seating of the cover 62. The color of cover 62 may be determined by a standard corresponding to the type of fluid to be received in service port 10. Providing a removable cover provides flexibility for changing the color of the cover as needed for different filler applications. It will be understood though that in certain applications, such as when no interlock assembly is provided, cover 62 is optional as the portion 41 of body defining bore 35 may be constructed of a solid wall.

According to another aspect of the invention, second portion 42 of body 30 may be contoured to facilitate attachment of a strainer 100 described more completely below. Second portion 42 may include one or more strainer receivers, generally indicated by the number 70. The shape and configuration of strainer receivers 70 may vary depending on the type of fill port strainer 100 and the mechanisms provided thereon to facilitate its attachment to body 30. In the example shown, strainer receiver 70 includes a cap 72 that projects radially outward from body 30. Cap 72 defines a hollow chamber 74 that has a downwardly facing opening 76. A pair of such strainer receivers 70 are diametrically opposed on body 30 in the given example to receive attachment assemblies 125 on fill port strainer 100 described more completely below. In addition, as best shown in FIG. 5, a lip 78 may extend around body 30 between strainer receivers 70. Lip 78 may be located at the same height as the lower extremity of cap 72. Second portion 42 may further include a lower lip 80 that defines a recess 82 below upper lip 78. To accommodate attachment assembly 125, gaps or recesses 82 may be provided within lip 80 to receive portions of the attachment assembly 125 as described more completely below.

A strainer 100 according to the invention is attached to body 30 at restrictor 42 to strain the fluid emanating from restrictor 42 before it enters tank 20. Fill port strainer 100 includes a strainer element 110 oriented generally parallel to the direction of flow. This arrangement is used to help improve the flow rate by minimizing the straining surface area normal to the flow path. To that end, strainer element 110 may have a depth greater than its diameter. Strainers found in the art typically use a screen that is inserted within the nozzle N or around the lower end of service port 10 to strain the liquid. These screens often have no depth or a very shallow depth (less than ½ of the diameter of bore 35). The effect of this shallow depth is that the majority of the screen lies normal to the flow path. In this position, the screen provides a significant impediment to the fluid flow into the tank.

In the present invention, strainer is provided with a more effective depth to diameter ratio to reduce the portion of strainer material normal to the flow path relative to existing screens thereby improving the flow relative to these prior art devices. According to the invention, a depth of the screen element to diameter of bore 35 ratio may be greater than 0.5 to improve the flow rate relative to prior art screens. According to another embodiment, depth to diameter ratios of 1:1 to 10:1 were suitable. Depth to diameter ratios of greater than 10:1 are suitable as well. Practically speaking the benefit of larger depth to diameter ratios may decrease as depth increases and other considerations such as the usable depth available in the filler neck 15 may come into consideration when determining the depth to diameter ratio for a given application. In the example shown, the depth to diameter ratio is about 4:1.

Strainer element 110 may be constructed of any material suitable for removing debris, contaminants or other matter entrained in the liquid as needed by a given application. Strainer element 110 may be a rigid or flexible material. In the example shown, strainer element 110 is constructed of a flexible mesh material such as a mesh fabric or flexible screen. Strainer element 110 includes a closed first end 111 and open second end 112. The second end 112 fits over second portion 42 of body 30 such that the end of bore 35 opens into second end 112. The sides 113 of mesh component may be closed or joined together to form a bag-like strainer element 110 that defines a strainer volume 115 therein. For example strainer element 110 may be constructed by folding a mesh sheet to form a pair of opposing walls 114 (FIG. 5) folded over at first end and sealing the sides 113 together while leaving second end 112 open. Sealing of the sides 113 may be accomplished in any known manner including applying an adhesive, applying heat to weld the sides together, or by providing a component that clamps or fastens the sides together. In the example shown, a support assembly 120 is molded on to strainer element 110 to fasten the two layers of mesh material together at sides 113. Support assembly includes first and second support element 121 that extend the length of strainer element 110. Support elements 121 may be provided regardless of the connection of sides 113 for reasons described below.

Strainer element 110 may have any shape or configuration with attention to surrounding elements, such as, the filler neck or confines of the tank in which it is inserted. In the example shown, strainer element 110 has an outwardly flared shape corresponding to the confines of a filler neck for a DEF application. The filler neck size is defined by ISO 22241. First end of strainer element 110 may have a maximum lateral dimension similar to or slightly smaller than filler neck 15 to maximize the available surface area for straining and facilitate free liquid flow. The second end 112 of strainer element 110 is sized to fit onto body 30 of service port 10. The restrictor diameter of service port 10 in a DEF application is also defined by ISO 22241. As shown restrictor diameter is less than the internal diameter of filler neck and as a result, the strainer element 110 flares outward as it extends downward from second end 112 to first end 111.

Figure 4:
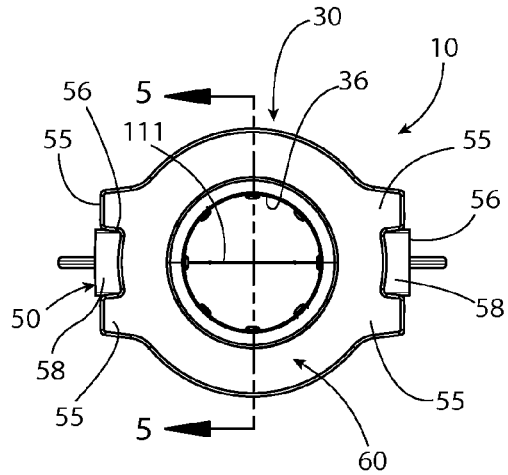
FIG. 4 is a top plan view thereof.
Figure 6:
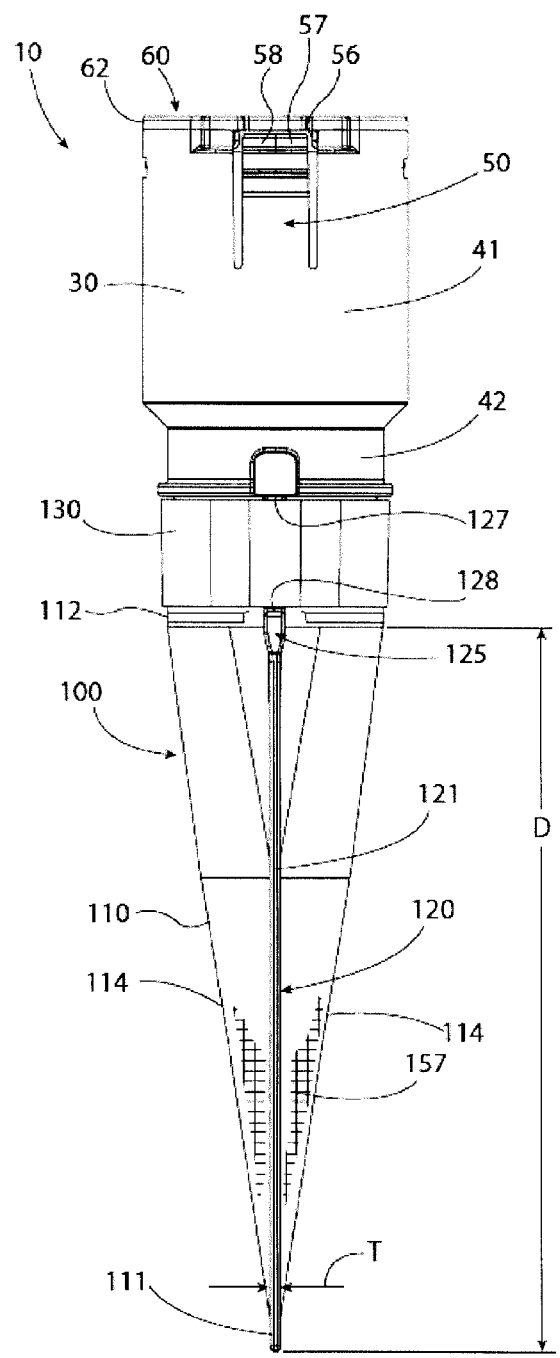
FIG. 6 is a side elevational view thereof.

To help strainer element 110 hold a desired shape, a support assembly 120 may be provided. Support assembly 120 may include any structure that maintains the strainer element 110 in a desired shape. Support assembly may include an exo-skeletal or endo-skeletal support structure relative to the strainer volume 115. In the example shown, a pair of support elements 121 are attached to an exterior surface of strainer element 110. Support elements 121 are thin plastic members that extend along each side 113 of strainer element 110. As best shown in FIGS. 3 and 6, width W of support elements 121 is larger than a thickness T of support elements 121. The thickness T of support elements 121 is relatively thin allowing the support element 121 to flex across the thickness. The width W is greater compared to thickness T giving support elements 121 greater strength in the direction of width and providing more rigidity and resistance to flexing in this direction. This facilitates the support elements 121 maintaining spreading the sides 113 of strainer element 110 apart and maintaining the walls 114 of strainer element 110 in a configuration where the portion normal to the flow F (i.e. first end 111 best seen in FIG. 4) is minimized. As best shown in FIG. 6, the cylindrical opening at second end 112 of strainer element 110 accommodates the diameter of restrictor 42. The support elements 121, which are diametrically opposed relative to restrictor 42 extend downward a depth D. The small thickness T of support elements 121 causes the walls 114 of strainer element 110 to converge at first end 111 such that the profile of strainer element 110 narrows from second end 112 to first end 111 in a somewhat triangular profile. Only a thin line of strainer material at first end 111 is normal to the flow F. The remainder of the strainer element 110 is oblique to flow F. The depth D of strainer element 110 is longer than diameter d of bore 35 such that the walls 114 extend substantially parallel to the flow F. It will be understood that the greater the depth D, the more parallel the walls 114 may be. The depth to diameter ratio is discussed in more detail below. With reference to FIG. 3, support elements may have a generally constant width W. In the example shown, the width W is generally constant until reaching the point where debris trap elements 150 are provided, as discussed more completely below, and then narrows gradually as the support elements 121 extend upward to restrictor 42.

Support elements 121 may have any cross-section. In the example shown, the cross-section of support elements 121 is generally a rectangular solid shape. Relative to body 30 first and second support elements are diametrically opposed to each other to help flatten the first end 111 of strainer element 110 minimizing the surface area normal to the flow path of fluid exiting body 30. Support elements 121 are symmetrical in the example shown, but non-symmetrical elements may be used. Support elements 121 include attachment portions 125 that extend upward of second end 112. Attachment portions 125 may simply be an extension of support elements 121 that are held against or otherwise attached to body 30. In the example shown, these extensions are slightly thicker than support elements 121 to provide more rigidity to attachment portion 125 and facilitate securement to the body 30.

As best shown in FIG. 8, according to one embodiment, attachment portions 125 define a recess 126 therein with shoulders 127 and 128 formed respectively at the upper and lower extremities of recess 126. An elastomeric band, hose clamp, clip, or other fastener 130 may fit over attachment portions 125 at recess 126 and retained between shoulders 127, 128 to hold attachment portions 125 to body 30. As shown, second end 112 fits over a portion of body 30 and also may be secured to body 30 with fastener 130. To seal and further secure second end 112, an adhesive 132 may be applied between body 30 and second end 112. Optionally, as shown, an end 129 of attachment portion 125 may be received within strainer receivers 70. For example, a thickened end 129 may be provided on each support element 121. End 129 is designed to be insertably received through opening 76 in cap 72 and reside within chamber 74 when strainer element 110 is attached. An outward bias created within ends 129 may help retain ends within chamber 74 when attached to attach strainer element 110 to body 30.

According to another aspect of the invention, support elements 121 may include a debris trap element, generally indicated by the number 150, extending inwardly therefrom. Debris trap elements 150 extend inward into the strainer volume 115 to catch debris 152 that may be splashed or bubble upward toward body 30. Debris trap elements 150 may be spaced axially outward from body 30 and extend inward to a point commensurate with the bore opening so that they do not extend into the flow of fluid from bore. In the example shown in FIG. 8, each debris trap element 150 terminates at a tip 151, where the tips 151 are radially spaced from each other by a gap 153 that is equal to the diameter d of bore 35. In other embodiments, debris trap elements 150 may extend into the flow F reducing the space between tips 151 from that example shown or having tips 151 that are connected to each other. Debris trap elements 150 may be made thin relative to the direction of the flow to help maintain a strainer element configuration that minimizes the portion normal to the flow. Likewise, when debris trap elements 150 enter the flow, they may be made thin or may be provided with an aerodynamic profile in the direction of the flow to reduce their interference with the flow. In the example shown, debris trap elements 150 have the same thickness T as support elements 121 (FIG. 6).

As best shown in FIGS. 3 and 8, debris trap elements 150 extend inward from the edges 113 of strainer element to form a debris trap area or pocket 155 downstream of debris trap element 150. Effectively, debris trap element 150 acts as a stop for upward bubbling, splashing or other up-currents, schematically shown at C, created by the flow F through strainer volume 115 to stop any debris within this flow from bubbling up to block or interfere with flow from bore 35. As shown, debris trap elements 150 may be angled axially outward i.e. in the direction of the flow. In the example shown, debris trap elements 150 extend radially inward and axially outward from support elements 120 forming an acute angle on the axial outward side of the debris trap element 150. A debris pocket, indicated at 155 is formed between debris trap element 150 and support 120. It will be understood that if support element is omitted and debris trap element 150 extends from the side of strainer element 110, the pocket 155 may be formed between the outward edge of debris trap element and side 113 of strainer element 110. Debris trap pocket 155 is shielded from outward flow from nozzle N by debris trap elements 150 such that any debris that gathers in this area is not reintroduced into the flow reducing the likelihood that the debris would restrict or interfere with flow from body 30.

The fill port strainer 100 in the example shown is designed to capture particles greater than 90 microns and prevent them from entering the tank 20. Openings 157 (exaggerated in the drawings for visibility) in the mesh fabric shown are 85 microns. It will be understood that the openings 157 may be scaled up or down depending on the specifications for a filling application. Likewise, depending on the desired flow rate, the surface area of the strainer element 100 may be increased or decreased proportionately. The proportions of the strainer element 110, support assembly 120 and debris trap element 150 shown are merely one example and these proportions may be varied individually without departing from the scope of the invention.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A service port for a tank that receives a fluid, the service port comprising:
   a body having a first end and a second end, the body defining a bore that opens at the first end and second end of the body, wherein the second end is downstream of the first end;
   a strainer attached to the second end of the body, the strainer including a strainer element that has a first end and a second end, the strainer element further comprising a mesh screen folded over at the first end of the strainer element and joined at a first side and a second side, thereby forming two opposing walls extending from the first end;
   wherein the strainer element is closed at the first end, the walls diverging from each other as they extend from the first end such that the strainer element is open at the second end defining a strainer volume therebetween; the strainer element being permeable to liquid;
   wherein the second end of the strainer element is attached about the bore to receive fluid from the bore within the strainer volume and wherein the opposing walls are oriented generally parallel to a flow direction of the fluid.

2. The service port of claim 1 further comprising a support assembly adapted to hold at least a portion of the opposing walls of the strainer element generally parallel to the flow direction.

3. The service port of claim 2, wherein the support assembly includes a first support element on one side of the strainer element and a second support element on a second side of the strainer element, wherein each support element extends from first end of strainer element to second end of strainer element;
   and wherein the first and second support elements are diametrically opposed to each other extend radially outward relative to the body to cause the strainer element to flare outward as it extends axially outward from body.

4. The service port of claim 1 further comprising a first debris trap element extending radially inward from the first side and a second debris trap element extending radially inward from the second side forming a debris pocket on a downstream side thereof.

5. The service port of claim 4, wherein the first debris trap element and second debris trap element end in tips that are radially spaced from each other an amount equal to a diameter of the bore.

6. The service port of claim 1, wherein the bore has a diameter and the strainer element extends from the second end of the bore a depth, wherein the depth of the strainer element is greater than diameter of the bore.

7. The service port of claim 6, wherein the ratio of the depth of the strainer element relative to the diameter of the bore is between 1:1 and 10:1.

8. The service port of claim 7, wherein the ratio is about 4:1.

9. The service port of claim 1, wherein the body includes a compartment formed within the body radially outward of the bore and separated therefrom, wherein the compartment houses an interlock assembly.

10. The service port of claim 9, wherein the interlock assembly is a magnet.

11. The service port of claim 9, wherein the compartment is open at the first end of the body, wherein the service port further comprises a cover attachable to the body to close the compartment at the first end of the body.

12. The service port of claim 11, wherein the body includes an outer wall, the outer wall defining a pair of receivers that include an opening in the outer wall; the cover including a pair of detents receivable in the receivers to attach the cover to the body, wherein the detents are visible through the opening in each receiver when the cover is attached.

13. The service port of claim 1 wherein the body includes a detent assembly at the first end of the body, the detent assembly including a pair of flexible arms formed on the body, each arm including a radially outward extending projection having a top surface and a leading edge that extends radially inward from the top surface; a pair of retaining tabs located above and spaced axially from the top surface of each projection, wherein the retaining tabs extend radially outward to define a gap between the top surface of the projection and a lower surface of each retaining tab.

14. The service port of claim 13, wherein the detent assembly is formed integrally with the body.

15. The service port of claim 1 further comprising a tank having a filler neck, wherein the strainer element is insertable in the filler neck and the body is supported on the filler neck and wherein the bore of the body is fluidly connected to the tank to deliver a liquid into the tank.

16. The service port of claim 15, wherein the liquid is aqueous urea solution.

17. The service port of claim 1, wherein the mesh screen has openings of less than 90 microns.

18. The service port of claim 17, wherein the openings in the mesh screen are 85 microns.

19. A service port for delivering a liquid comprising:
a body defining a bore through which liquid is delivered,
a strainer in fluid communication with the bore, the strainer including a strainer element including a first end, a second end, the strainer element further comprising a mesh screen folded over at the first end of the strainer element and joined at a first side and a second side, thereby forming two opposing walls extending from the first end,
wherein the walls diverge from each other as they extend from the first end such that they define an enclosed strainer volume open at the second end to allow the liquid from the bore to enter the strainer volume,
wherein the strainer element is constructed of a porous material that is permeable to the liquid;
wherein the strainer further includes a support assembly engaging the strainer element and spreading the sides of the strainer element away from each other along at least a portion of the strainer element adjacent to the first end to minimize a portion of the strainer element normal to the liquid flowing from the bore.

20. The service port of claim 19, wherein the strainer element further includes a debris trap element extending inwardly from each of the sides, each debris trap element terminating in a tip, wherein the tips of the debris trap elements are radially spaced from each other an amount equal to a diameter of the bore.

21. A strainer for a service port that provides a flow of liquid, the strainer comprising:
a strainer element including a first end, a second end, the strainer element further comprising a mesh screen folded over at the first end of the strainer element and joined at a first side and a second side, thereby forming two opposing walls extending from the first end, wherein the strainer element defines an enclosed strainer volume open at the second end,
wherein the strainer element is constructed of a porous material that is permeable to the liquid;
wherein the strainer further includes a first debris trap element extending from the first side and a second debris trap element extending from the second side, the first and second debris traps joining the two opposing walls together.

22. The strainer of claim 21 wherein the first and second debris trap elements extend radially inward from each side, the first and second debris trap elements defining a trap pocket open toward the first end of the strainer element.

* * * * *